United States Patent
Hayakawa et al.

(10) Patent No.: US 6,247,683 B1
(45) Date of Patent: Jun. 19, 2001

(54) DAMPER WITH VEHICLE HEIGHT ADJUSTMENT FUNCTION

(75) Inventors: Yukio Hayakawa; Kiyoshi Nakahara, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/364,266

(22) Filed: Jul. 30, 1999

(30) Foreign Application Priority Data

Aug. 3, 1998 (JP) .................................................. 10-219299

(51) Int. Cl.[7] ........................................................ F16F 5/00
(52) U.S. Cl. ............................................................. 267/64.11
(58) Field of Search .................................... 188/276, 277, 188/278; 267/64.13, 64.14, 121, 64.16, DIG. 1, DIG. 2, 64.11

(56) References Cited

U.S. PATENT DOCUMENTS

| | | | |
|---|---|---|---|
| 3,836,132 | * 9/1974 | McNally et al. | 267/64.17 |
| 4,226,408 | * 10/1980 | Tomita et al. | 188/315 |
| 4,484,732 | * 11/1984 | Gould | 267/64.14 |
| 4,513,953 | * 4/1985 | Moulders et al. | 267/121 |
| 4,597,565 | * 7/1986 | Smith | 188/276 |
| 4,651,979 | * 3/1987 | Freitag et al. | 188/276 |

* cited by examiner

*Primary Examiner*—Robert J. Oberleitner
*Assistant Examiner*—Robert A. Siconolfi
(74) *Attorney, Agent, or Firm*—Sughrue, Mion, Zinn, Macpeak & Seas, PLLC

(57) ABSTRACT

A case is provided on an outside of a damper main body that is connected to a damper rod and which can freely move in vertical directions. A pressure chamber is formed between the damper main body and the case in which a pressure medium is sealed up, which pressure medium changes its phase between vapor and liquid phases. The pressure medium is heated and vaporized by heat generated by virtue of a damping effect of the damper, while the pressure medium is condensed by virtue of heat radiating from the case by running wind. During the running on a rough road when the heating value of the damper becomes large, the internal pressure of the pressure chamber is increased to thereby raise the vehicle height, and during the running at high speeds when the heat radiating value becomes large, the internal pressure of the pressure chamber is decreased to thereby lower the vehicle height.

5 Claims, 4 Drawing Sheets

DAMPER WITH VEHICLE HEIGHT ADJUSTMENT FUNCTION

BACKGROUND OF THE INVENTION

1. Field of the Invention

The present invention relates to a damper with a vehicle height adjustment function for incorporation in a suspension of vehicles such as automobiles.

2. Description of the Related Art

A damper for vehicles includes a damper main body and a damper rod inserted into the damper main body in such a manner as to freely move therein in vertical directions. One of the damper main body and the damper rod is connected to a spring lower member, while the other is connected to a vehicle body, whereby a damping effect is obtained for vibrations of the vehicle body.

Conventionally, known as a damper with a vehicle height adjustment function is a self-pumping type damper in which a pumping unit is interposed between a vehicle body and the damper for sending oil from a low pressure chamber to a high pressure chamber through pumping actions resulting from vibrations of the vehicle body to thereby raise the vehicle body higher by virtue of the pressure in the high pressure chamber.

The self-pumping type damper has a drawback that the construction of the pumping unit becomes complicated, resulting in high costs. In addition, it has also a drawback that although it is desirable to lower the height of the vehicle when running at high speed for the sake of vehicle running stability, the self-pumping type damper is designed to react only to vibrations and is not adapted to react to the vehicle speed, and therefore with the self-pumping type damper, it is not possible to lower the vehicle height while running at high speed.

SUMMARY OF THE INVENTION

The present invention was made in view of the above situation, and an object thereof is to provide a damper with a vehicle height adjustment function, which is simple in construction and low in cost, and can raise the vehicle height when running on a rough road and lower the same when running at high speed.

With a view to solving the problems, the present invention provides a damper with a vehicle height adjustment function for vehicles including a damper main body and a damper rod inserted into the damper main body in such a manner as to freely move therein in vertical directions, a cylindrical case provided on an outside of the damper main body in such a manner as to freely move in vertical directions and connected to the damper rod, and a pressure chamber formed between the damper main body and the case and having sealed therein a pressure medium which changes its phase between vapor and liquid phases, wherein the pressure medium is heated and vaporized by heat generated by virtue of a damping effect of the damper.

When running on a rough road, the magnitude of vibrations of the vehicle body becomes large, and the heating value of the damper is increased by virtue of the damping effect thereof, whereby the heating and vaporization of the pressure medium inside the pressure chamber is promoted. As a result of this, the internal pressure of the pressure chamber is increased, and the case, in other words, the damper rod is pushed toward an extension side relative to the damper main body by virtue of the internal pressure of the pressure chamber, thereby raising the vehicle height.

When running at high speed, the magnitude of vibrations of the vehicle body is small (because a high-speed running is performed on a road such as a motor way whose road surface is free from irregularities), and the heating value of the damper is decreased. On the other hand, the running wind becomes stronger and this increases the heat radiating value from the case, the condensation of the pressure medium inside the pressure chamber being thereby promoted. As a result of this, the internal pressure inside the pressure chamber is decreased, and the damper rod is displaced to a contraction side relative to the damper main body, thereby lowering the vehicle height.

In addition, a change in vehicle height associated with a change in outside temperature can be prevented with a heating means for heating the pressure medium and a control means for controlling the heating means in response to the outside temperature so as to compensate for reduction in internal pressure of the pressure chamber when the outside temperature is low.

DETAILED DESCRIPTION OF THE PREFERRED EMBODIMENTS

Figure 1:
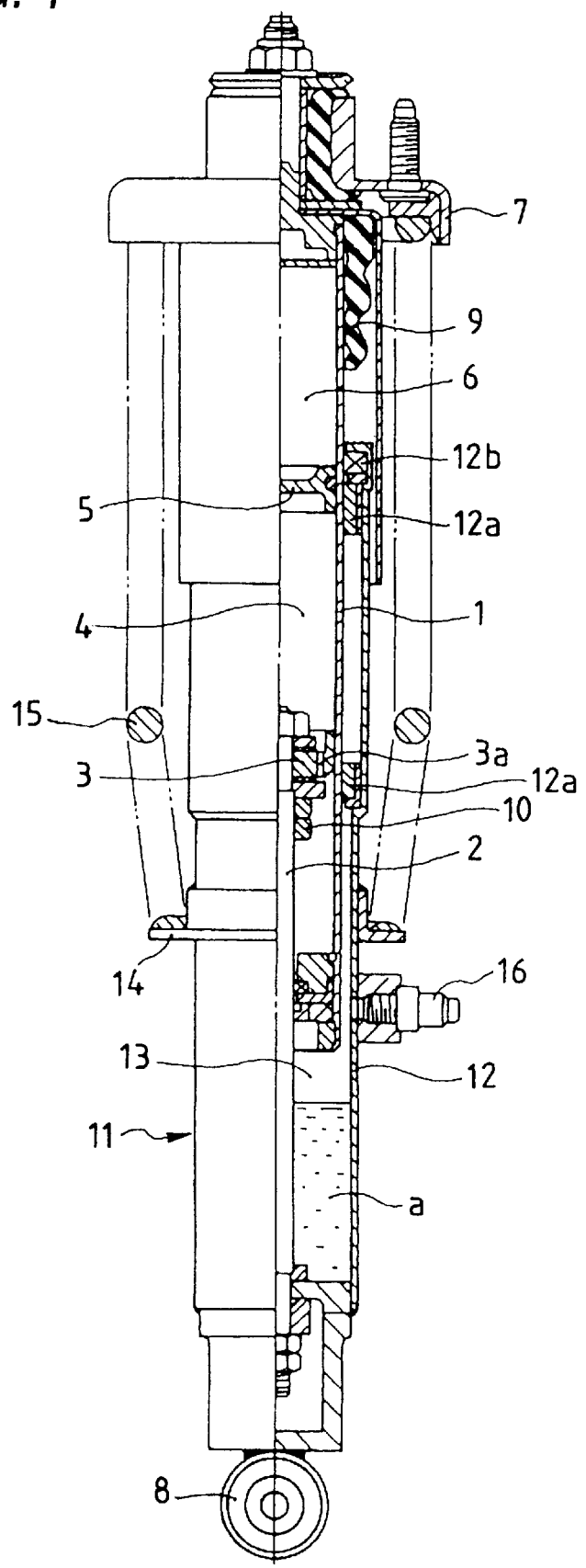
FIG. 1 is a side view, half in cross-section, of a damper according to a first embodiment of the present invention.

In FIG. 1, reference numeral 1 denotes a cylindrical damper main body, and a damper rod 2 is inserted into the damper main body 1 from below in such a manner as to freely move therein in vertical directions. A damper piston 3 having an orifice hole 3a is mounted on an upper end of the damper rod 2. Formed inside the damper main body 1 are an oil chamber 4 into which the damper piston 3 is inserted and an upper gas chamber 6 partitioned by a free piston 5 from the oil chamber 4. Thus, an inverted type hydraulic damper is constructed. The damper main body 1 is connected to a vehicle body via a bracket 7 attached to an upper end thereof, while the damper piston 3 is connected to a spring lower member via a bushing 8 attached to a lower end thereof, whereby an damping effect is designed to be obtained for damping vibrations of the vehicle body in vertical directions relative to the spring lower member. Moreover, a bump stop rubber 9 is provided underneath the bracket 7 and a rebound stop rubber 10 is provided underneath the damper piston 3, whereby stopper functions are obtained against the bumping action (contracting action) and rebound action (extending action) of the damper.

In addition, provided on the damper is a vehicle height adjustment portion 11 having sealed therein a pressure medium, such as R134a or R152a, which changes its phase between vapor and liquid phases and has a low boiling point. The vehicle height adjustment portion 11 is constructed by providing a cylindrical case 12 on an outside of the damper main body 1 in such a manner as to freely move in vertical directions and connecting airtightly the same case 12 to the damper rod 2 at a lower end thereof. The case 12 is brought into sliding contact with an outer circumference of the damper main body 1 via a pair of upper and lower guide rings 12a, 12a. Further, a seal member 12b is mounted at an upper end of the case 12 for sealing a gap between the damper main body 1 and the case 12. Thus, a sealed pressure chamber 13 is defined between the damper main body 1 and the case 12 for receiving therein in a sealed fashion a pressure medium containing lubricating oil mixed therewith. Furthermore, a spring seat 14 is mounted on the outer circumference of the case 12 at an intermediate position along the length thereof, and a suspension spring 15 is interposed between the spring seat 14 and the bracket 7. In FIG. 1, reference numeral 16 denotes an injection plug for the pressure medium.

With the hydraulic damper, kinetic energy is transformed into thermal energy by using the passing resistance at the orifice hole 3a of the damper piston 3 to thereby attain a damping effect. Then, heat generated by the damping effect is conducted to the pressure chamber 13 via the damper main body 1 and the damper rod 2, and a pressure medium (a) in a liquid phase in the pressure chamber 13 is heated and vaporized. On the other hand, running wind is blown against the case 12 to produce a cooling effect, which functions to radiate heat from the pressure chamber 13, and the pressure medium then in a vapor phase in the pressure chamber 13 is condensed. Thus, the internal pressure (the vapor pressure of the pressure medium) inside the pressure chamber 13 is increased and/or decreased in response to the relative relationship between the heating value of the damper resulting from the damping effect and the heat radiating value from the case 12.

Figure 4:
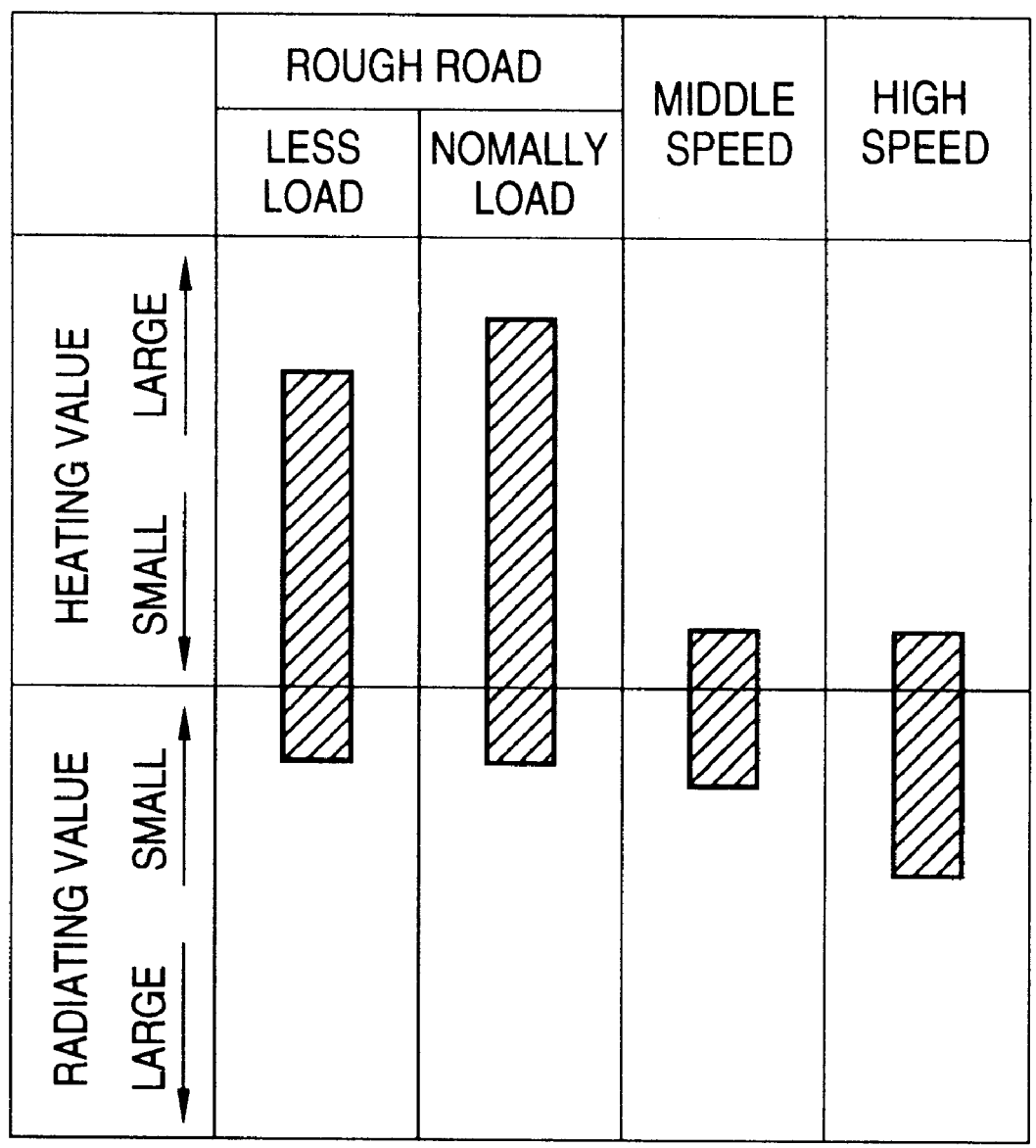
FIG. 4 is a table showing changes in heating value of the damper and heat radiating value from the case in a running state.

FIG. 4 shows a relative relationship between the heating value of the damper and the heat radiating value from the case 12 in response to a running condition of the vehicle. When running on a rough road, the magnitude of vibrations of the vehicle body becomes large and the heating value of the damper is increased, while the heat radiating value from the case 12 is decreased because the vehicle is run at lower speeds on the rough road, whereby the internal pressure of the pressure chamber 13 is increased. As a result of this, the damper rod 2 is pushed to the extension side by virtue of the internal pressure of the pressure chamber 13, thereby raising the vehicle height. In this state, since the magnitude of vibrations of the vehicle body becomes larger when normally loaded than when less loaded, the heating value of the damper is increased, and therefore an increase in load on the spring is compensated for by an increase in vapor pressure inside the pressure chamber 13, the vehicle height being thereby maintained as high as when less loaded.

When running at middle speed on ordinary roads, the magnitude of vibrations of the vehicle body becomes small and the heating value of the damper is reduced. In addition, the heat radiating value from the case 12 is increased when compared with the low-speed running, whereby the internal pressure inside the pressure chamber 13 is decreased, the vehicle height being thereby restored to the normal vehicle height.

In addition, when running at high speed on motor ways, the heating value of the damper remains substantially the same as that produced when running at middle speed, while the heat radiating value from the case 12 becomes larger than when running at middle speed, whereby the internal pressure inside the pressure chamber 13 is decreased lower than that resulting when running at middle speed, this lowering the vehicle height so as to improve the vehicle running stability.

Figure 2:
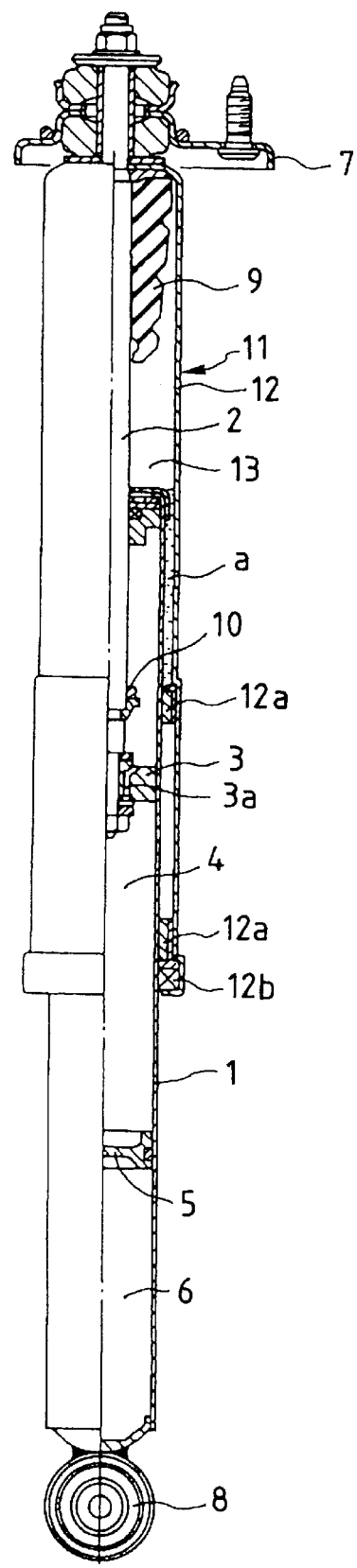
FIG. 2 is a side view, half in cross-section, of the damper according to a second embodiment of the present invention.

In the above embodiment, the present invention is described as applied to the inverted type hydraulic damper, however, the present invention can equally be applied to a hydraulic damper according to a second embodiment as shown in FIG. 2 in which a damper rod is inserted into a damper main body 1 from above, and in which the damper rod 2 is connected to a vehicle body at an upper end thereof, the damper main body 1 being connected to a spring lower member at a lower end thereof. In addition, the damper shown in FIG. 2 is more or less similar in construction to the damper according to the first embodiment shown in FIG. 1 except that they are in inverse relation to each other, and in FIG. 2, members like to those shown in the first embodiment are given like reference numerals. In the second embodiment of the present invention, a liquid reservoir for a pressure medium is formed in a gap between an outer circumference of the damper main body 1 and a case 12, and the pressure medium (a) in a liquid phase is heated and vaporized by virtue of heat conduction mainly through the damper main body. Furthermore, the damper according to the second embodiment is a damper for application to an independent spring type suspension, and there is mounted thereon no suspension spring 15.

Figure 3:
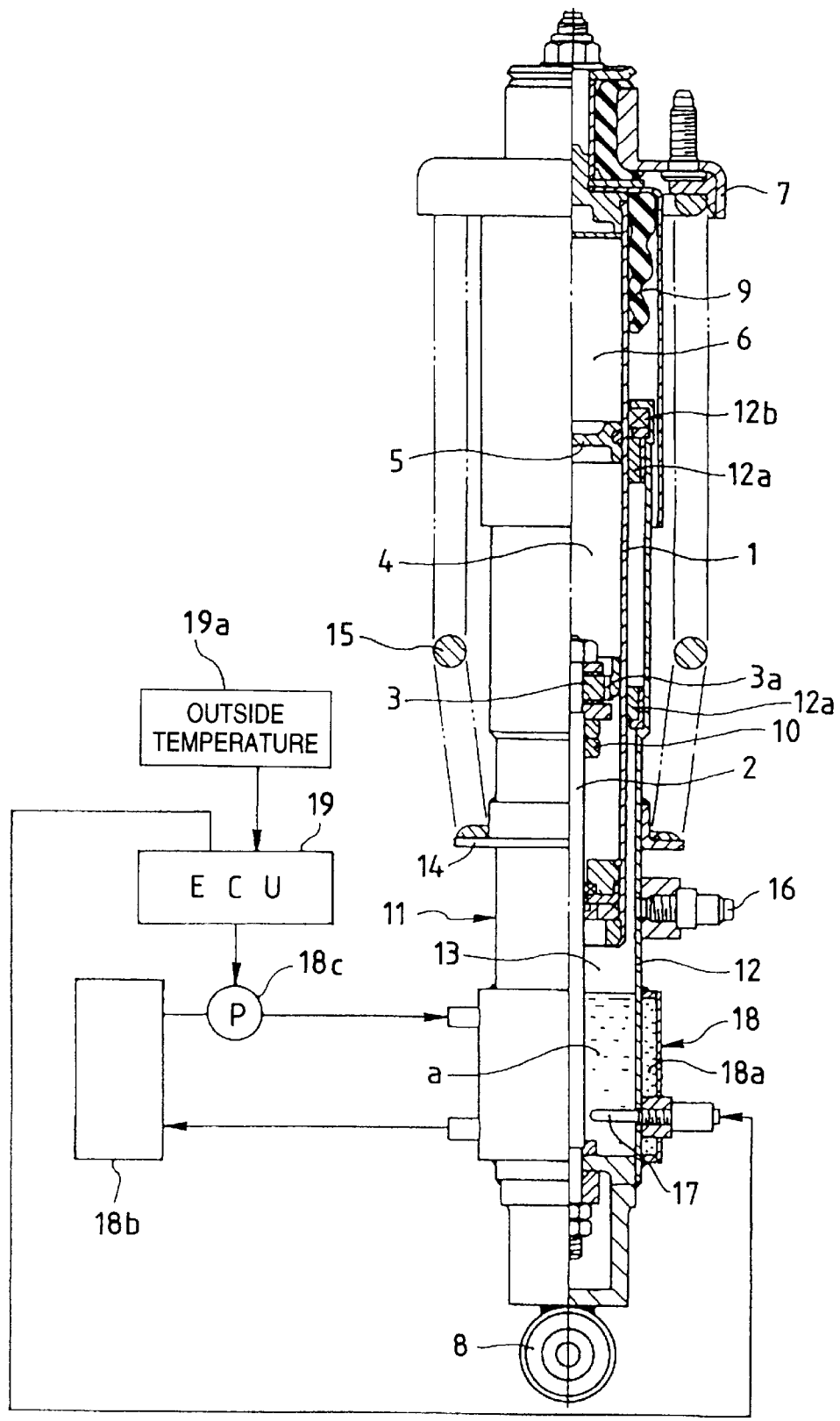
FIG. 3 is a side view, half in cross-section, of the damper according to a third embodiment of the present invention.

With the aforesaid vehicle height adjustment portion 11 of a heat-pressure transformation type, the vehicle height is easily changed by the outside temperature. To cope with this, in a third embodiment shown in FIG. 3, there are provided a heating means 17 for heating the pressure medium inside the pressure chamber 13, a cooling means 18 for cooling the pressure medium and a control means 19 for controlling the heating means 17 and cooling means 18 in response to the outside temperature to thereby compensate for change in internal pressure in the pressure chamber 13 resulting from change in outside temperature.

In the third embodiment, the heating means 17 is constituted by an electric heater provided in the pressure chamber 13, the cooling means 18 by a jacket portion 18a provided in the case 12, a reserve tank 18b containing cooling water and a pump 18c for circulating water between the jacket portion 18a and the reserve tank 18b, and the control means 19 by an electronic control unit (ECU) into which a signal from a sensor 19a for detecting the outside temperature is inputted. In this construction, when the outside temperature is reduced, the electric heater 17 is energized so as to compensate for reduction in internal pressure inside the pressure chamber 13, while when the outside temperature is increased, the pump 18c is energized so as to compensate for increase in internal pressure inside the pressure chamber 13 through a cooling effect. The cooling means 18 may be omitted from the damper for use in a region where the outside temperature is not expected to become as high as such a means is required.

Thus, although the embodiments of the present invention have been described heretofore in which the present invention is applied to the hydraulic dampers, it should be understood that the present invention may be applied to dampers other than hydraulic dampers such as a friction damper.

As is clear from the above description of the present invention, according thereto, not only is it possible to raise the vehicle height when running on a rough road but also it is possible to lower the same when running at high speed in response to vehicle speeds. Moreover, the structure of the dampers according to the present invention is made simple by providing the case on the outside of the damper main body and sealing up the pressure medium in the case. Consequently, the simple structure serves to reduce the production costs.

The present disclosure relates to the subject matter contained in Japanese patent application No. Hei. 10-219299 filed on Aug. 3, 1998 which is expressly incorporated herein by reference in its entirety.

What is claimed is:

1. A damper with a vehicle height adjustment function for vehicles comprising:

a damper main body;

a damper rod inserted into said damper main body in such a manner as to be vertically movable therein;

a cylindrical case provided on an outside of said damper main body in such a manner as to be vertically movable and connected to said damper rod; and a pressure chamber formed between said damper main body and said case and having a pressure medium sealed therein, said pressure medium changing its phases between vapor and liquid phases, wherein said pressure medium is heated and vaporized by heat generated by virtue of a damping effect of said damper so as to change an internal pressure inside said pressure chamber in order to facilitate the vehicle height adjustment function.

2. A damper with a vehicle height adjustment function according to claim 1, wherein said damper main body defines an oil chamber inserted with said damper rod having a damper piston with an orifice, and said damper piston is arranged at an end of said damper rod so as to be received within said oil chamber.

3. A damper with a vehicle height adjustment function according to claim 2, wherein a part of said pressure chamber is arranged around said oil chamber, said pressure chamber is partitioned with a seal member provided between said damper main body and said case.

4. A damper with a vehicle height adjustment function comprising:

a damper main body;

a damper rod inserted into said damper main body in such a manner as to be vertically movable therein;

a cylindrical case provided on an outside of said damper main body in such a manner as to be vertically movable and connected to said damper rod;

a pressure chamber formed between said damper main body and said case and having a pressure medium sealed therein, said pressure medium changing its phases between vapor and liquid phases, wherein said pressure medium is heated and vaporized by heat generated by virtue of a damping effect of said damper;

heating means for heating said pressure medium; and control means for controlling said heat means in response to the outside temperature so as to compensate for reduction in internal pressure of said pressure chamber when the outside temperature is low.

5. A damper with a vehicle height adjustment function according to claim 4, further comprising:

cooling means for cooling said pressure medium, wherein said control means further controls said cooling means in response to the outside temperature so as to compensate for increase in internal pressure of said pressure chamber when the outside temperature is high.

* * * * *